(12) United States Patent
Lee et al.

(10) Patent No.: US 9,660,280 B2
(45) Date of Patent: May 23, 2017

(54) SYSTEM AND METHOD OF CONTROLLING FUEL CELL SYSTEM USING A DRAIN-PURGE VALVE

(71) Applicant: Hyundai Motor Company, Seoul (KR)

(72) Inventors: Hyun Jae Lee, Seoul (KR); Ik Jae Son, Gyeonggi-Do (KR); Yei Sik Jeon, Seoul (KR); Deuk Keun Ahn, Gyeonggi-Do (KR); Sung Bum Choi, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 161 days.

(21) Appl. No.: 14/501,684

(22) Filed: Sep. 30, 2014

(65) Prior Publication Data
US 2015/0280260 A1    Oct. 1, 2015

(30) Foreign Application Priority Data

Mar. 25, 2014   (KR) .................. 10-2014-0034673

(51) Int. Cl.
| | | |
|---|---|---|
| H01M 8/04 | (2016.01) | |
| H01M 8/0444 | (2016.01) | |
| H01M 8/04223 | (2016.01) | |
| H01M 8/04291 | (2016.01) | |
| H01M 8/04119 | (2016.01) | |

(52) U.S. Cl.
CPC ... *H01M 8/04462* (2013.01); *H01M 8/04164* (2013.01); *H01M 8/04231* (2013.01); *H01M 8/04291* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 6,242,120 | B1 * | 6/2001 | Herron .............. | H01M 8/04179 429/431 |
| 2007/0111046 | A1 * | 5/2007 | Spare ................ | H01M 8/04231 429/429 |
| 2011/0212371 | A1 * | 9/2011 | Itoga ................. | H01M 8/04097 429/414 |
| 2013/0209902 | A1 * | 8/2013 | Mazzotta .......... | H01M 8/04097 429/410 |

FOREIGN PATENT DOCUMENTS

| | | | | |
|---|---|---|---|---|
| JP | 2007-035389 A | | 2/2007 | |
| JP | 2009-123613 | * | 6/2009 | ............. H01M 8/04 |

(Continued)

*Primary Examiner* — Ula C Ruddock
*Assistant Examiner* — Tony Chuo
(74) *Attorney, Agent, or Firm* — Mintz Levin Cohn Ferris Glovsky and Popeo, P.C.; Peter F. Corless

(57) ABSTRACT

A system and method of controlling fuel cell system is provided that simultaneously drains condensation and purges hydrogen via single valve. In particular, condensate water is drained by opening a drain-purge valve at a point in time at which a production amount of the condensate water exceeds a capacity of a water trap. An opening time of the drain-purge valve is then determined depending on a hydrogen concentration of an anode side and a target hydrogen concentration after the draining the condensate water. Hydrogen is then purged by maintaining the drain-purge valve in a state in which it is opened for the determined opening time.

6 Claims, 3 Drawing Sheets

(56) References Cited

FOREIGN PATENT DOCUMENTS

| JP | 2009-176493 | * | 8/2009 | ............. H01M 8/04 |
|----|----|----|----|----|
| JP | 2009-176493 A | | 8/2009 | |
| JP | 2010-080434 A | | 4/2010 | |
| JP | 2010-123427 A | | 6/2010 | |
| JP | 2010-199038 A | | 9/2010 | |
| KR | 10-2007-0028963 | | 3/2007 | |
| KR | 10-2009-0100736 | | 9/2009 | |
| KR | 10-2010-0136716 | | 12/2010 | |
| KR | 10-2013-0057357 A | | 5/2013 | |

* cited by examiner

SYSTEM AND METHOD OF CONTROLLING FUEL CELL SYSTEM USING A DRAIN-PURGE VALVE

CROSS REFERENCE TO RELATED APPLICATION

The present application claims priority of Korean Patent Application Number 10-2014-0034673 filed on Mar. 25, 2014, the entire contents of which application are incorporated herein for all purposes by this reference.

BACKGROUND OF THE INVENTION

1. Technical Field

The present invention relates to a system and method of controlling a fuel cell system, and more particularly, to a system and method of controlling a fuel cell system that simultaneously implements hydrogen purging and condensation water draining functions using a single valve.

2. Description of the Related Art

A fuel cell vehicle includes a fuel cell stack in which a plurality of fuel cells used as a power source are stacked, a fuel supplying system supplying hydrogen, which is a fuel, or the like, to the fuel cell stack, an air supplying system supplying oxygen, which is an oxidizing agent required for an electrochemical reaction, water and a heat managing system that controls the temperature of the fuel cell stack, and the like.

In particular, the fuel supplying system decreases pressure of compressed hydrogen in a hydrogen tank and supplies the compressed hydrogen of which the pressure is reduced to an anode of the fuel cell stack, and the air supplying system supplies external air sucked in by operating an air blower to a cathode of the fuel cell stack.

When hydrogen is supplied to the anode of the fuel cell stack and oxygen is supplied to the cathode of the fuel cell stack, hydrogen ions are separated through a catalytic reaction in the anode. The separated hydrogen ions are transferred to an oxidizing electrode, which is the cathode, through an electrolyte membrane, and the hydrogen ions separated in the anode generates an electrochemical reaction together with electrons and the oxygen in the oxidizing electrode, thus generating electrical energy may be obtained. In detail, electrochemical oxidization of the hydrogen occurs in the anode, and electrochemical reduction of the oxygen occurs in the cathode. Electricity and heat are generated due to movement of electrons generated through the above-mentioned process, and water vapor or water is generated by a chemical action that the hydrogen and the oxygen are bonded to each other.

In order to release hydrogen and oxygen that do not react and result in byproducts such as water vapor, water, and the heat generated in an electric energy generating process of the fuel cell stack, a draining device is provided. As such, gases, such as the water vapor, the hydrogen, the oxygen, and the like, are drained to the atmosphere through a draining path.

Meanwhile, an amount of water in the fuel cell stack should be appropriately adjusted. As an ion exchange membrane configuring a membrane electrode assembly is humidified, ion conductivity of the ion exchange membrane is increased, thereby making it possible to increase reaction efficiency of the fuel cell stack. On the other hand, when an amount of water is excessively large, a liquefaction process of the water vapor easily occurs to impede a contact between a catalyst and reaction gases, thereby making it possible to decrease reaction efficiency of the fuel cell stack.

In most fuel cell systems, a hydrogen vent valve for adjusting the amount of hydrogen that is drained from the system and for adjusting an amount of water in a fuel cell stack is utilized to increase fuel efficiency, while still preventing a surplus In these systems, a hydrogen vent valve is repeatedly opened and closed by a control signal to allow a fuel and condensate water in the fuel cell stack to remain in the system for a predetermined time and be drained to the outside after the predetermined time has expired.

However, the point in time at which the condensate water needs to be drained and a point in time at which the fuel needs to be drained may be different from each other. As such, there is increased degree of likelihood that a flooding phenomenon will occur in the fuel cell stack, the hydrogen will be excessively drained, thereby decreasing fuel efficiency, and the durability of the stack may be decreased due to a decrease in a concentration of internal reaction gas.

SUMMARY OF THE INVENTION

An object of the present invention is to provide a system and method of controlling a fuel cell system that improves fuel efficiency and durability of a fuel cell stack in spite of draining condensate water and a fuel through one valve.

According to an exemplary embodiment of the present invention, there is provided a system and method of controlling a fuel cell system, including: draining condensate water by opening a drain-purge valve at a point in time at which a production amount of the condensate water exceeds a capacity of a water trap; determining an opening time of the drain-purge valve depending on a hydrogen concentration of an anode side and a target hydrogen concentration after the draining; and purging hydrogen by maintaining the drain-purge valve in a state in which it is opened for the determined opening time.

As such, the draining of the condensate water may include calculating a production amount of the condensate water depending on a production speed of the condensate water calculated based on an average output current of a fuel cell stack.

The average output current may be an average value of a plurality of output current data measured for a preset time. This average output current may be updated at a preset period.

In calculating the production amount of the condensate water, when a temperature of the fuel cell stack is different from a target temperature, the production speed of the condensate water may be calculated by multiplying a production speed of the condensate water at the target temperature by a scale factor.

The determining of the opening time of the drain-purge valve may include: calculating a correction accumulated electric charge amount based on an output current of the fuel cell stack and a correction factor that becomes different depending on the output current; and determining the opening time according to a hydrogen concentration depending on the calculated correction accumulated electric charge amount and a preset target hydrogen concentration. This correction factor may be changed depending on an average current change rate.

The average current change rate may be determined depending on a comparison result between an average value of all current data and an average value of a preset number of current data measured last among all the current data.

The correction factor may be changed so that it is smaller than a correction factor corresponding to the output current when the average current change rate is increased or increasing, and may be changed so that it is larger than the correction factor corresponding to the output current when the average current change rate is decreased or decreasing.

BRIEF DESCRIPTION OF THE DRAWINGS

Detailed descriptions of the accompanying drawings are provided in order to sufficiently understand the accompanying drawings mentioned in a detailed description of the present invention.

DESCRIPTION OF THE EXEMPLARY EMBODIMENTS

Figure 1:
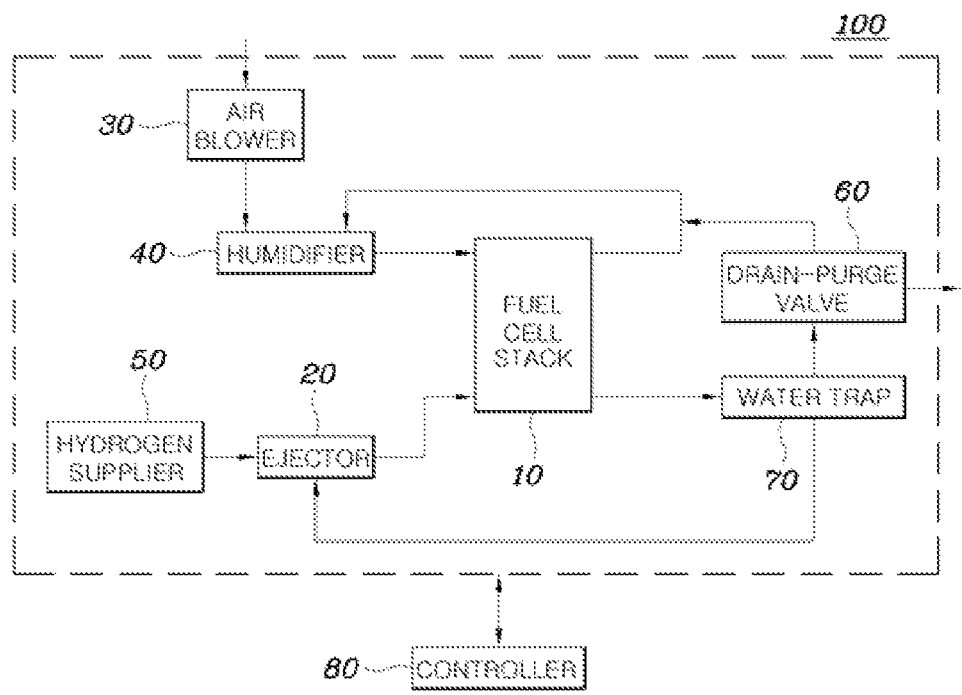
FIG. 1 is a configuration diagram of a fuel cell system 100 according to an exemplary embodiment of the present invention.

Specific structural and functional descriptions will be provided only in order to describe various exemplary embodiments of the present invention disclosed in the present specification or disclosure. Therefore, exemplary embodiments of the present invention may be implemented in various forms, and the present invention is not to be interpreted as being limited to exemplary embodiments described in the present specification or disclosure.

Since exemplary embodiments of the present invention may be various modified and may have several forms, specific exemplary embodiments will be shown in the accompanying drawings and will be described in detail in the present specification or disclosure. However, it is to be understood that the present invention is not limited to specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes fuel cell vehicles, fuel cell hybrid vehicles, fuel cell electric vehicles, plug-in fuel cell hybrid electric vehicles, fuel cell hydrogen-powered vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals proposed in each drawing denote like components.

FIG. 1 is a configuration diagram of a fuel cell system 100 according to an exemplary embodiment of the present invention. Referring to FIG. 1, the fuel cell system 100 according to an exemplary embodiment of the present invention may be configured to include a fuel cell stack 10, an ejector 20, an air blower 30, a humidifier 40, a hydrogen supplier 50, a drain-purge valve 60, a water trap 70, and a controller 80. Since some of the components of the fuel cell system 100 as described above are well known in the related art, a description of each of the components will be omitted.

In particular, hydrogen supplier 50, for example a hydrogen tank, stores high pressure hydrogen therein and supplies the high pressure hydrogen to the fuel cell stack. The high pressure hydrogen discharged from the hydrogen supplier 50 is again pressure-decreased by a pressure regulator, a pressure adjusting valve, an injector, a pressure adjusting actuator (not shown), and the like, and is supplied together with a recirculation gas supplied into the supply line by the ejector 20 to the fuel cell stack 10.

The ejector 20 supplies low pressure hydrogen pressure-decreased from the high pressure hydrogen supplied through the hydrogen supplier 50 to the fuel cell stack 10. In addition, the ejector 20 may suck in and recirculate hydrogen that does not react in an anode of the fuel cell stack 10 using low pressure generated by a high speed hydrogen jet as the high pressure hydrogen passes through a nozzle (e.g., a convergent nozzle or convergent-divergent nozzle).

The drain-purge valve 60 is a valve for removing impurities in the anode of the fuel cell stack 10. Water produced due to an electrochemical reaction in a fuel cell is produced within the fuel cell stack 10 and should be periodically drained to the outside of the fuel cell stack 10. When the water is not appropriately drained from the inside of the fuel cell stack 10, flooding can occur. This impedes the supply of the hydrogen, and thus deteriorates power generation performance of the fuel cell stack 10 and causes damage to components of the fuel cell stack 10 in the most serious cases.

In order to drain the water of the anode, a flow speed of a fluid (e.g., a fluid mixed gas including moisture) within the fuel cell stack 10 should be increased by increasing a flow amount of hydrogen within the fuel cell stack 10. In this case, periodical hydrogen purging is mainly used. That is, when the moisture within the fuel cell stack 10 is to be removed, purging is performed through the drain-purge valve 60, thereby making it possible to temporally increase a flow amount of the hydrogen within the fuel cell stack 10. The purging through the drain-purge valve 60 not only serves to decrease a concentration of nitrogen introduced into the anode, but also drains some hydrogen to the outside the system thus decreasing fuel efficiency and cause environmental pollution.

The controller 80 may be configured to open and close the drain-purge valve 60 to adjust draining of condensate water and purging of the hydrogen. In detail, the controller 80 may open the drain-purge valve 60 to drain the condensate water when a production amount of condensate water exceeds a capacity of the water trap 70. When the draining of the condensate water ends, the controller 80 may determine an opening time of the drain-purge valve 60 depending on a hydrogen concentration of an anode side of the fuel cell stack 10 and a target hydrogen concentration. That is, the controller 80 may drain the condensate water by opening the drain-purge valve 60 and purge the hydrogen by keeping the same drain-purge valve 60 open once the draining of the condensate water ends for a predetermined time.

First, in connection with the draining of the condensate water, the controller 80 may calculate an average output current of the fuel cell stack to calculate a production speed of the condensate water. The average output current and the production speed of the condensate water may be and are preferably substantially proportional to each other. The controller 80 may calculate the production amount of the condensate water depending on the calculated production speed of the condensate water. The controller 80 compares the production amount of the condensate water with the capacity of the water trap 70. The capacity of the water trap 70 may vary depending on a kind of the water trap 70 that is being used. That is, the controller 80 may compare the production amount of the condensate water with the capacity of the water trap 70 (set during initial configuration) and open the drain-purge valve 60 to drain the condensate water when the production amount of the condensate water is equal to or greater than the capacity of the water trap 70.

Here, the average output current of the fuel cell stack 10 is an average value of a plurality of output current data measured for a preset time. The average output current may be updated at a predetermined period with the passage of time. That is, the controller 80 may calculate the production speed of the condensate water through the average value of the output currents of the fuel cell stack 10 measured for a preset time as the output current of the fuel cell stack 10 is changed. Then, the controller 80 may calculate a production speed of the condensate water in the next period through an average value of output currents of the fuel cell stack 10 for a preset time in the next period based on a continuously changed output current of the fuel cell stack 10.

Alternatively, the controller 80 may also determine a point in time at which the condensate water will be drained depending on a value sensed by a level sensor (not shown) within the water trap 70.

In addition, the controller 80 may consider an operating temperature when calculating the production speed of the condensate water. In detail, as compared with the case in which the production speed is calculated when a temperature arrives at a target operating temperature, when the temperature does not arrive at the target operating temperature, the production speed may be calculated by multiplying the production speed calculated in the state in which the temperature arrives at the target operating temperature by a scale factor.

In the above scenario when the temperature does not reach the target operating temperature, a temperature of the fuel cell stack 10 can be higher or lower than a target temperature. In the case in which the temperature is lower than the target operating temperature, a production speed of the condensate water is increased, and in the case in which the temperature is higher than the target operating temperature, a production speed of the condensate water is decreased. Therefore, when the temperature is lower than the target operating temperature, the scale factor may be a value larger than 1, and in the case in which the temperature is higher than the target operating temperature, the scale factor may be a value smaller than 1.

The controller 80 may determine a time in which the hydrogen is purged after the draining of the condensate water ends. The controller 80 may integrate the product of the output current of the fuel cell stack 10 and a correction factor changed depending on the output current to calculate a correction accumulated electric charge amount. In addition, the controller 80 may calculate a hydrogen concentration depending on the calculated correction accumulated electric charge amount. The controller 80 may determine the opening time of the drain-purge valve 60 depending on the calculated hydrogen concentration and the target hydrogen concentration.

This correction factor may be varied in order to reflect a hydrogen concentration change depending on the current and a current change direction. That is, whether the current is changed from a high current to a low current or is changed from a low current to a high current.

As an example, the correction factor may be changed depending on an average current change rate. The average current change rate may be a value obtained by dividing an average value of all current data by an average value of a preset number of current data measured temporally last among all the current data. For example, when the average value of the recent data is greater than that of all the current data through comparison between all the current data and the recent data, it means that the average current is changed in a positive direction, and when the average value of the recent data is less than that of all the current data through comparison between all the current data and the recent data, it means that the average current is changed in a negative direction.

When the average current change rate exceeds 1, the correction factor determined according to a magnitude of the output current may be changed so as to be smaller. In addition, in the case in which the average current change rate is less than 1, the correction factor determined according to the magnitude of the output current may be changed so as to be larger.

The controller 80 may temporally integrate the product of the changed correction factor and the output current to calculate an electric charge amount and calculate the hydrogen concentration based on the calculated electric charge amount. The controller 80 may compare the calculated hydrogen concentration with the target hydrogen concentration to determine a hydrogen purging time.

That is, a total opening time of the drain-purge valve 60 may be a value obtained by adding a time for draining the condensate water and a hydrogen purging time determined depending on the target hydrogen concentration and the current hydrogen concentration of the anode side.

Figure 2:
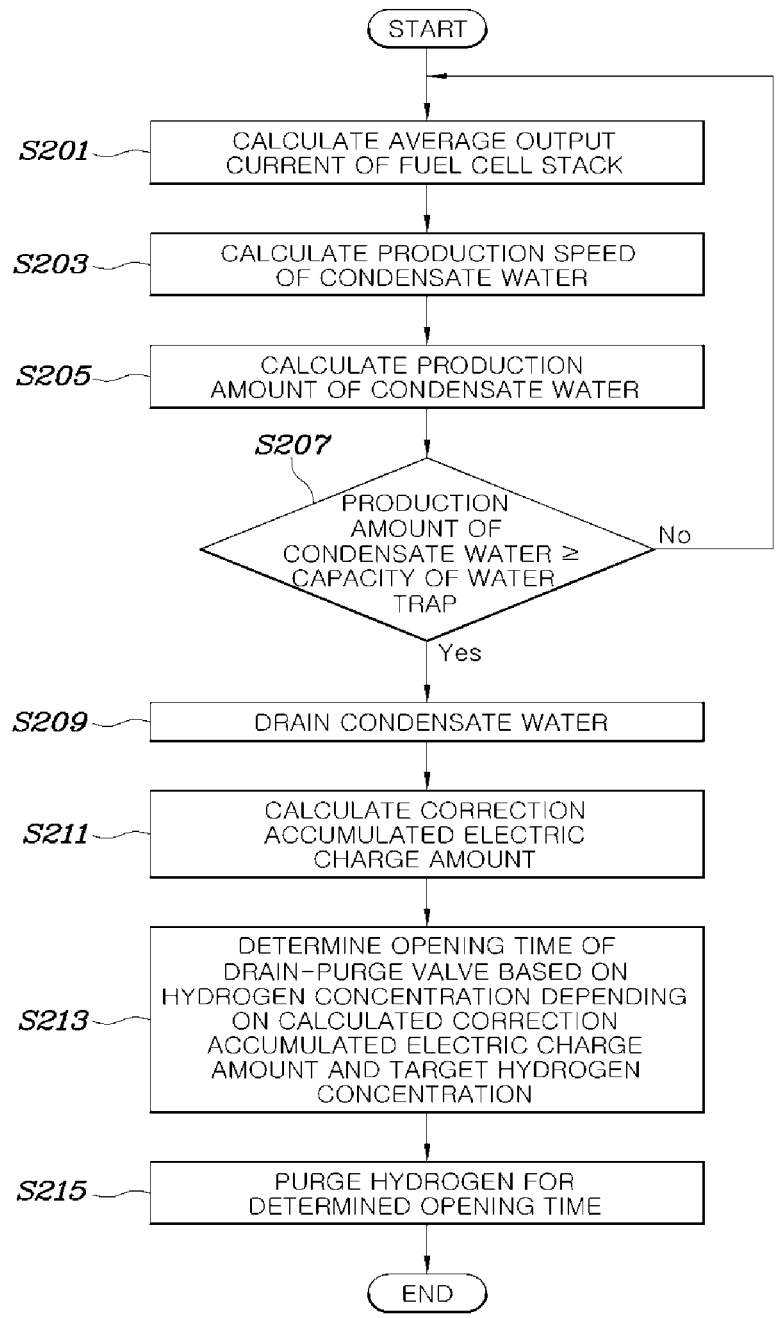
FIG. 2 is a flow chart showing a controlling method of a fuel cell system according to an exemplary embodiment of the present invention.

FIG. 2 is a flow chart showing a controlling method of a fuel cell system according to an exemplary embodiment of the present invention. Referring to FIGS. 1 and 2, the controller 80 may first calculate the average output current of the fuel cell stack 10 (S201). The controller 80 may calculate the production speed of the condensate water depending on the calculated average output current (S203). In detail, a relationship between the calculated average output current and the production speed of the condensate water may be represented by the following Equation 1.

Production Speed of Condensate Water=$A$*Average Output Current+$B$ (here, $A$ and $B$ indicate constants) [Equation 1]

This relationship corresponds to when the temperature of the fuel cell stack 10 arrives at a preset target operating temperature. When the temperature of the fuel cell stack 10 is different from the preset target operating temperature, the relationship between the calculated average output current and the production speed of the condensate water may be represented by the following Equation 2.

Production Speed of Condensate Water=($A$*Average Output Current+$B$)*$C$ (here, $A$, $B$, and $C$ indicate constants) [Equation 2]

That is, in a transient state in which the current temperature of the fuel cell stack 10 is converged on the target operating temperature, the production speed of the condensate water may be calculated by multiplying a production speed of the condensate water at the target temperature by a scale factor C. For example, in the case in which a driver rapidly accelerates a vehicle, the temperature of the fuel cell stack 10 may be higher than the target operating temperature. In this case, the production speed of the condensate water may be lower than that of the condensate water at the target temperature. The scale factor C is to reflect this.

When the production speed is calculated, the controller 80 may calculate the production amount of the condensate water accumulated by multiplying the production speed by a time (S205). The controller 80 may compare the calculated production amount of the condensate water with the capacity of the water trap 70 (S207), and open the drain-purge valve 60 to drain the condensate water (S209) when the calculated production amount of the condensate water is equal to or greater than the capacity of the water trap 70.

After draining the condensate water ends, the controller 80 may calculate the current hydrogen concentration of the anode side in order to purge the hydrogen through the drain-purge valve 60. An electric charge amount should be calculated in order to calculate the hydrogen concentration, and a correction accumulated electric charge amount should be calculated in order to reflect a dynamically changed output current (S211).

The correction accumulated electric charge amount may be a value obtained by temporally integrating the product of the output current and the correction factor. The correction factor may be a value that becomes different depending on a range of the output current and may have a value of 1 or more.

The correction factor may be changed depending on an average output current change rate. For example, when the average output current change rate is increased, the correction factor may be changed so that it is less than a correction factor determined depending on the range of the output current. In addition, when the average output current change rate is decreased or is decreasing, the correction factor may be changed so as to be larger than a correction factor determined depending on the range of the output current. This is to recognize a change in the output current by comparing an average value of a preset number of output current data measured relatively later among all output current data within a preset time range with an average value of all the output current data and reflect the change in the correction factor.

In detail, the average output current change rate may be a value obtained by dividing the average value of all the current data by the average value of the preset number of current data measured last among all the current data. Directionality of a change from a low output current to a high output current or a change from a high output current to a low output current may be recognized through the average output current change rate. In the case in which the average output current change rate is greater than 1, that is, in the case in which value obtained by dividing the average value of all the current data by the average value of the preset number of current data measured last among all the current data is larger than 1, when the average value of all the current data is greater than the average value of the preset number of current data measured last, the correction factor may be changed so as to be less than the correction factor determined depending on the range of the output current. That is, a relationship such as Correction Factor=Correction Factor*A (0<A<1) may be satisfied.

Alternatively, in the case in which the average output current change rate is smaller than 1, a relationship such as Correction Factor=Correction Factor*B (1<B) may be satisfied.

The hydrogen concentration of an outlet of the anode side may be calculated using the correction accumulated electric charge amount. The correction accumulated electric charge amount may be calculated by temporally integrating the product of the output current and the correction factor. That is, the correction accumulated electric charge amount is represented by the following Equation 3.

Correction Accumulated Electric Charge Amount=∫(Current*Correction Factor) $dt$

Hydrogen Concentration (%)=$A$*log(Correction Accumulated Electric Charge Amount)+ $B$*Time+$C$ (here, $A$, $B$, and $C$ indicate constants)     [Equation 3]

That is, the output current of the fuel cell stack and the correction factor that varies depending on the output current and is changed depending on the average current change rate are multiplied by each other and are temporally integrated, such that the correction accumulated electric charge amount is determined. When the correction accumulated electric charge amount is determined, the hydrogen concentration may be calculated.

The controller 80 may determine the opening time of the drain-purge valve 60 depending on the calculated hydrogen concentration and the target hydrogen concentration to (S213). That is, the controller 80 may open the drain-purge valve 60 to first drain the condensate water, and compare the calculated hydrogen concentration with the target hydrogen concentration to determine a time in which the drain-purge valve 60 should be closed after the draining of the condensate water ends. The hydrogen, and the like, may be purged for a time in which the drain-purge value 60 remains opened after the water is drained (S215).

As such, only one drain-purge valve 60 is used to drain the condensate water and purge the hydrogen, and the like. The draining of the condensate water and the purging are continuously periodically performed through one drain-purge valve 60. To this end, the controller 80 determines a point in time at which the condensate water is drained and the opening time of the drain-purge valve 60. Therefore, the unnecessary waste of the hydrogen is decreased, thereby making it possible to improve fuel efficiency, while at the same time making it possible to prevent the fuel cell stack from flooding.

Figure 3:
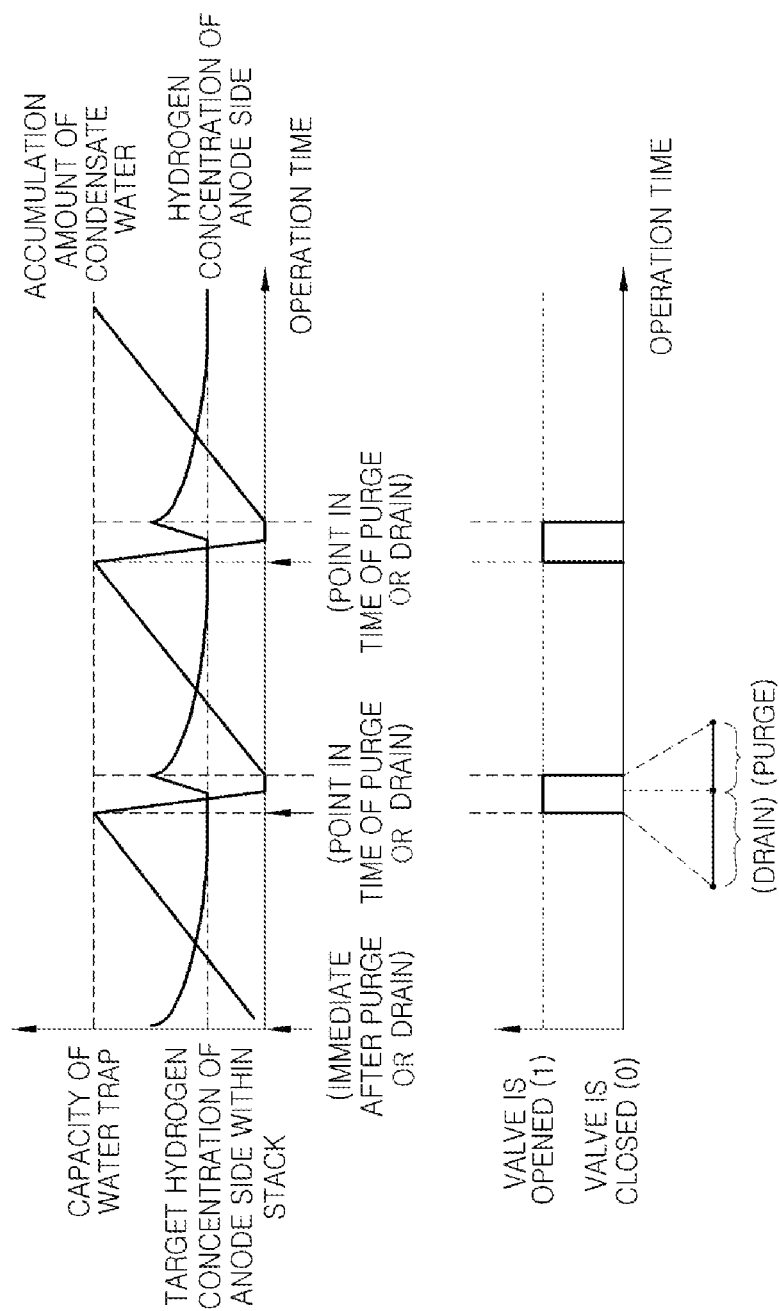
FIG. 3 is a graph showing an operation of a drain-purge valve over time in the fuel cell system according to an exemplary embodiment of the present invention and changes in concentrations of condensate water and hydrogen corresponding to the operation.

FIG. 3 is a graph showing an operation of a drain-purge valve over time in the fuel cell system according to an exemplary embodiment of the present invention and changes in concentrations of condensate water and hydrogen corresponding to the operation. Referring to FIG. 3, it may be appreciated that the drain-purge valve is opened when an accumulated amount of the condensate water arrives at the capacity of the water trap and the purging starts when the accumulated amount of the condensate water becomes 0. When the purging starts, the opening time of the drain-purge valve is determined depending on the hydrogen concentration of the anode side and the target hydrogen concentration, and the purging is performed for the determined opening time, such that the hydrogen concentration of the anode side is increased.

Although the present invention has been described with reference to exemplary embodiments shown in the accompanying drawings, it is only an example. It will be understood by those skilled in the art that various modifications and equivalent other exemplary embodiments are possible from the present invention. Accordingly, an actual technical protection scope of the present invention is to be defined by the following claims.

What is claimed is:

1. A method of controlling a fuel cell system, comprising:
   draining, water from the fuel cell system by opening a drain-purge valve when a production amount of the water in the fuel cell system exceeds a capacity of a water trap;
   determining, by a controller, an opening time, during which the drain-purge valve remains open after the draining has completed, depending on a hydrogen concentration of an anode side and a target hydrogen concentration; and
   purging hydrogen by maintaining the drain-purge valve in an opened state for the determined opening time,
   wherein the determining of the opening time of the drain-purge valve includes:
   calculating a correction accumulated electric charge amount based on an output current of the fuel stack and a correction factor that becomes different depending on the output current;
   calculating a hydrogen concentration depending on the calculated correction accumulated electric charge amount; and
   determining the opening time according to the hydrogen concentration and a preset target hydrogen concentration,
   wherein the correction factor is changed depending on an average current change rate and the average current change rate is determined depending on a comparison result between an average value of all current data and an average value of a preset number of current data measured last among all the current data.

2. The method of controlling a fuel cell system of claim 1, wherein the draining of the water includes calculating a production amount of the water depending on rate of water generated which is calculated based on an average output current of a fuel cell stack.

3. The method of controlling a fuel cell system of claim 2, wherein the average output current is an average value of a plurality of output current data measured over a preset period of time.

4. The method of controlling a fuel cell system of claim 3, wherein the average output current is updated after a preset period of time.

5. The method of controlling a fuel cell system of claim 2, wherein in the calculating of the production amount of the water, when a temperature of the fuel cell stack is different from a target operating temperature, the rate of water generated is calculated by multiplying a rate of water generated at the target temperature by a scale factor.

6. The method of controlling a fuel cell system of claim 1, wherein the correction factor is changed to be less than a correction factor corresponding to the output current in the case in which the average current change rate increases and is changed to be greater than the correction factor corresponding to the output current when the average current change rate decreases.

* * * * *